US006567107B1

(12) United States Patent
Stannard

(10) Patent No.: US 6,567,107 B1
(45) Date of Patent: May 20, 2003

(54) METHOD AND SYSTEM FOR INDICATING A LICENSE STATUS OF AN OBJECT

(75) Inventor: Paul R. Stannard, San Diego, CA (US)

(73) Assignee: Smartdraw.Com, San Diego, CA (US)

( * ) Notice: Subject to any disclaimer, the term of this patent is extended or adjusted under 35 U.S.C. 154(b) by 0 days.

(21) Appl. No.: 09/492,444

(22) Filed: Jan. 27, 2000

(51) Int. Cl.[7] .............................................. G06F 17/30

(52) U.S. Cl. ...................................... 345/764; 345/765

(58) Field of Search ................................ 345/762, 765, 345/744, 853, 854, 764; 707/500, 526, 523

(56) References Cited

U.S. PATENT DOCUMENTS

| 5,438,508 | A | * | 8/1995 | Wyman | ......................... 705/8 |
| 5,671,412 | A | * | 9/1997 | Chrsitiano | ............... 707/104.1 |
| 5,758,069 | A | * | 5/1998 | Olsen | ...................... 707/104.1 |
| 6,198,480 | B1 | * | 3/2001 | Cotugno et al. | ............ 345/762 |

* cited by examiner

*Primary Examiner*—Cao (Kevin) Nguyen
(74) *Attorney, Agent, or Firm*—Gary Cary Ware & Freidenrich; Terrance A. Meador

(57) ABSTRACT

A tag is attached to an unlicensed object indicating that a user does not have an appropriate license for using the object. The tag partially obscures the object while allowing the object to function as a licensed object. The tag may be indicia that indicates the unlicensed status of the object. Drawings created with unlicensed objects may also be partially obscured with a tag.

25 Claims, 8 Drawing Sheets

METHOD AND SYSTEM FOR INDICATING A LICENSE STATUS OF AN OBJECT

BACKGROUND OF THE INVENTION

The invention relates in general to licensing objects and more specifically to a method and system for indicating the status of a license.

Numerous software applications exist for performing various types of functions on computers. Software distribution schemes allow users to download software through communication networks such as the Internet. Due to competition in the market, many software manufactures have used these distribution schemes to provide a free trial application to a potential customer allowing the potential customer to use the software application for a limited time or in a limited capacity. If satisfied, the customer may purchase the full commercial version of the software or may purchase a license to continue using the trial software application.

Conventional licensing schemes, however, are limited in several ways. If the licensing techniques provide a functionally limited version of the commercial software application, the software provider risks that the trial version will be adequate for the potential customer. If the trial version is severely limited in functionality, the software provider risks that the potential customer will not fully appreciate the capabilities of the commercial software. On the other hand, if the trial version is not limited enough, the potential customer will not buy the commercial version and will continue using the trial version eliminating a potential sale.

A licensing scheme involving a time limited version of the commercial product is limited in that trial time may be too long or too short. If the trial version is set to expire too early, the potential customer may not have an opportunity to adequately examine the software product. If the expiration of the trial software is set to far in the future, the potential customer may use the software to complete a project and may not desire to purchase the commercial version.

Drafting, graphic and other visual software applications are particularly sensitive to the issues discussed above. Most graphic applications use numerous drawing objects that typically need to be updated periodically. Further, the large libraries of drawing objects may need to be expanded to provide an adequate database of contemporary objects.

Therefore, there exists a need for method and system for licensing software, digital objects, and other digital data that allows a potential customer to sample the product with a maximum functionality while maintaining customer motivation to purchase a license.

SUMMARY OF THE INVENTION

In an exemplary embodiment of the invention, a licensing management system and method allows a graphics program to be sampled by a potential customer while maintaining a motivation of the potential customer to purchase a license. Drawing objects not having a valid license can be used within the graphics application in the same capacity as a licensed object except that the unlicensed objects are marked with tag indicating that the object is not licensed. The tag in the exemplary embodiment is text indicia printed across the object indicating that the object is not licensed. The tag is digitally connected to the object and cannot be separated without a proper license.

In addition to a tag associated with each unlicensed object, a drawing created with an unlicensed object is also marked with a tag indicating that the drawing was created without a license. The potential customer may continue to use and sample the software application and various libraries without obtaining a license. The potential customer, however, is motivated to purchase a license due to the inconvenience of the tags. In addition to unsightly tags found in the drawing, the potential customer will be motivated to obtain a license to avoid the appearance of impropriety when displaying the drawings in a business relationship.

This embodiment allows a user to have multiple licenses corresponding to different aspects of the graphics program. The user only pays for specific requested libraries and is not forced into paying a single licensing fee to obtain unwanted libraries or objects. The user can sample libraries without purchasing a license. Documents created with an unlicensed library will include the tags attached to unlicensed objects. The tags are removed, however, when a valid license is obtained.

In the exemplary embodiment, the user obtains immediate feedback of the licensing status when accessing libraries. If the user opens a library that is not licensed to the user, a message box is displayed indicating the library is unlicensed. When an unlicensed object is selected, the tag is visually displayed over the object as discussed above.

A valuable feature of the exemplary embodiment is that the license is not easily transferable from one user to another. Although a library van be transferred from one processor to another, a license associated with the library is embedded within application code and is difficult to locate. Further, in a preferred embodiment of the invention, the license is encrypted using the hard drive serial number of the user's computer.

Another feature of the exemplary embodiment is that the license for each library can be time limited. An expired, but otherwise valid, license allows the user to continue using the library without having tags displayed. A library opened with a valid license before the expiration of the license can be opened without invoking the unlicensed process of displaying tags on the objects of the library as long as the license can be located in memory. Therefore, the library can be used indefinitely if it had been opened with a valid license and the license exists in memory even if the license has expired.

An advantage of the exemplary embodiment is that newly developed libraries can be distributed to potential purchases on a subscription basis. A subscription to a particular library set results in the user receiving newly developed libraries related to the particular license during a predetermined period. The objects within new libraries downloaded by the user and opened during the license (subscription) duration will not contain the tags.

DETAILED DESCRIPTION OF THE PREFERRED EMBODIMENTS

Figure 1:
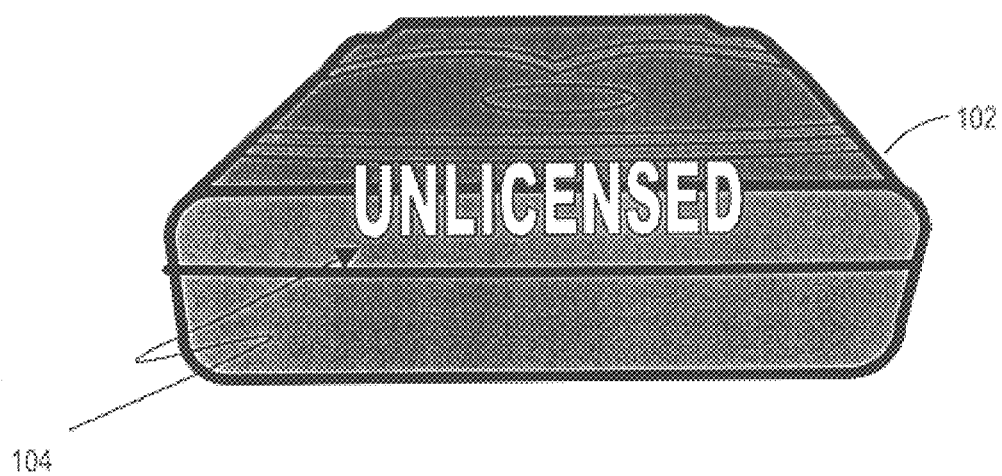
FIG. 1 is a pictorial representation of an exemplary display of unlicensed object having a tag in accordance with the exemplary embodiment of the invention.
Figure 3:
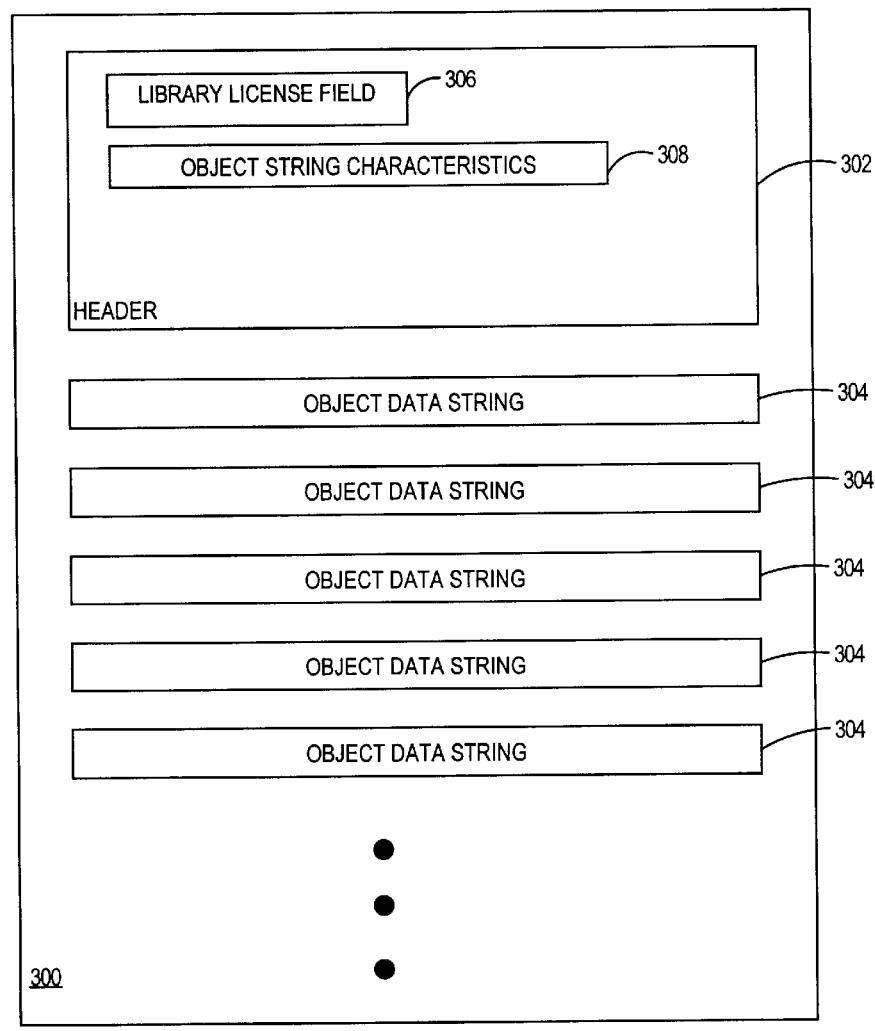
FIG. 3 is block diagram of an exemplary library.
Figure 7:
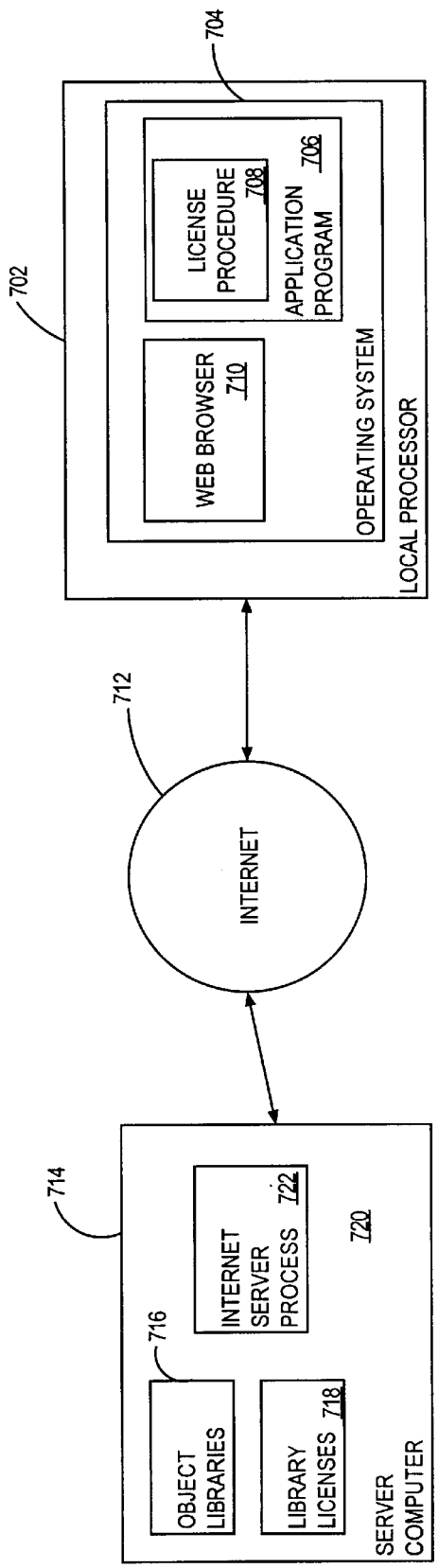
FIG. 7 is block diagram of a software distribution system in accordance with the exemplary embodiment of the invention.

Briefly referring to FIGS. 1, 3, and 7, a licensing method and system facilitates the licensing of objects 102 and object libraries 300 for use in a graphic drawing application program 706 in the exemplary embodiment. When run on a computer processor 702, the graphics program 706 facilitates efficient and accurate creation and editing of block diagrams, organizational charts, flow charts, schematics, floor plans, maps, presentations, clip art drawings, and other types of pictorial representations. Those skilled in art will recognize that application programs, such as the exemplary graphics program, include various lines of code arranged and formatted in accordance with the particular operating system 704 running on a computer.

The exemplary graphics program 706 utilizes a large number of drawing objects 102 representing various elements, figures or functional blocks that are arranged into several object libraries 300. The objects 102 within a library 300 are related by subject matter or by function. For example, a flow chart library containing the various block symbols used for creating a flow chart includes such shapes (objects) as ovals (start/end symbol), rectangles (perform function symbol), and diamonds (decision function symbol). Different object libraries 300 may contain some of the same objects 102 due to overlapping subject matter of different disciplines.

As explained below, the user obtains the graphics program 706 and the libraries 300 through the Internet 712 in the exemplary embodiment. The user logs onto the network 712, accesses a user interface provided by the software provider and downloads the desired libraries 300. Other methods such as mail distribution using CD-ROM or diskettes may be used in alternate embodiments.

A license procedure 708 implemented within the graphics program 706 manages licenses for libraries 300 and objects 102 by coupling a tag 104 to an object 102 to indicate that the object 102 is unlicensed. The license procedure 708 is implemented by running several lines of software code contained within the graphics program 706 on the computer 702. In the exemplary embodiment, therefore, the licensing procedure 708 is an integral part of the graphics program 706. In other embodiments, however, the licensing procedure 708 may be implemented as a separate routine that can be accessed by a main program (706).

The user may use the objects 102 within the library 300 to create drawings without purchasing a required license. If, however, a required license is not obtained for the downloaded library 300, the objects 102 within the unlicensed library 300 appear with indicia (104) across the object 102 partially obscuring the object 102 and clearly indicating that the object 102 is not licensed. As discussed below, various techniques may be used to tag the object 102 as unlicensed.

A drawing (document) created with unlicensed objects 102 is tagged as unlicensed. When the drawing containing unlicensed objects 102 is opened, a warning message is displayed indicating that the drawings contains unlicensed objects 102. An unlicensed object 102 within the document is displayed with a tag 104.

An object 102 from an unlicensed library 300 may be moved, coupled, and resized within the drawings with the same functionality as a licensed object 102. The unlicensed indicator (tag), however, cannot be removed from the object 102 without authorization and without great effort by the user. The ungroup function is disabled for an unlicensed object to discourage a user from ungrouping the various components of an unlicensed object 102 and selecting only the tag component (104) for deletion. If the user obtains a license, any existing documents (drawings) that have unlicensed objects 102 will not appear with the unlicensed indicator. Documents subsequent to obtaining the license and made during the license term will not include the unlicensed indicator. Drawings created by the user during the license term remain without the unlicensed indicators.

FIG. 1 is block diagram of an object 102 in accordance with the exemplary embodiment of the invention. The exemplary object 102 shown in FIG. 1 has a tag 104 indicating that the object 102 is unlicensed. The exemplary object 102 is a graphic representation of a piece of electrical equipment and is chosen for illustrative purposes. In the exemplary embodiment, the object 102 is any type of visual object such as drawing, photograph, symbol, or text The object 102 may also be a combination of two or more types of visual objects. The object 102 may be displayed on a video output device such as a display monitor, television, or projector or may be produced on a printing media such paper or velum by a video output device such as a printer, copier or facsimile machine.

The object 102 is, preferably an image created in accordance with the Windows® Application Program Interface (API). An object 102 may be a vector or bitmap image formatted in accordance with a Windows® Metafile Format (WMF) or other format that is operable with the Windows® API or any other API capable of producing images. As discussed below, the library contains an object data string that provides descriptive information related to each object 102. When a user performs operations to place and object 102 into a document from a library, the object data string is used to create an object record within the document. The object record contains the information and instructions that, when applied to the Windows® API, form the object 102 on the monitor screen or other media. A license indicator in the object record indicates where the object 102 is unlicensed and a tag should be included in the object 102 image. In the exemplary embodiment, the license indicator is a single bit that is set when the object record in the document is created. When the license indicator is interpreted by the application and the Windows® API, a record tag is retrieved and the object 102 is created with the tag.

In the exemplary embodiment, the tag record provides Windows® API based instructions to form indicia that is displayed over the object 102 allowing the object 102 to be partially obscured by the tag when the object 102 is displayed. Preferably, the tag is indicia having white letters with a black outline that clearly indicates that the object 102 is unlicensed. This allows the same tag file to be used with any type of object 102. If the object 102 is light colored, the black outlines around the white letters stand out against the lighter background. If the object 102 is dark, the white letters clearly show up against the darker background.

Figure 2:
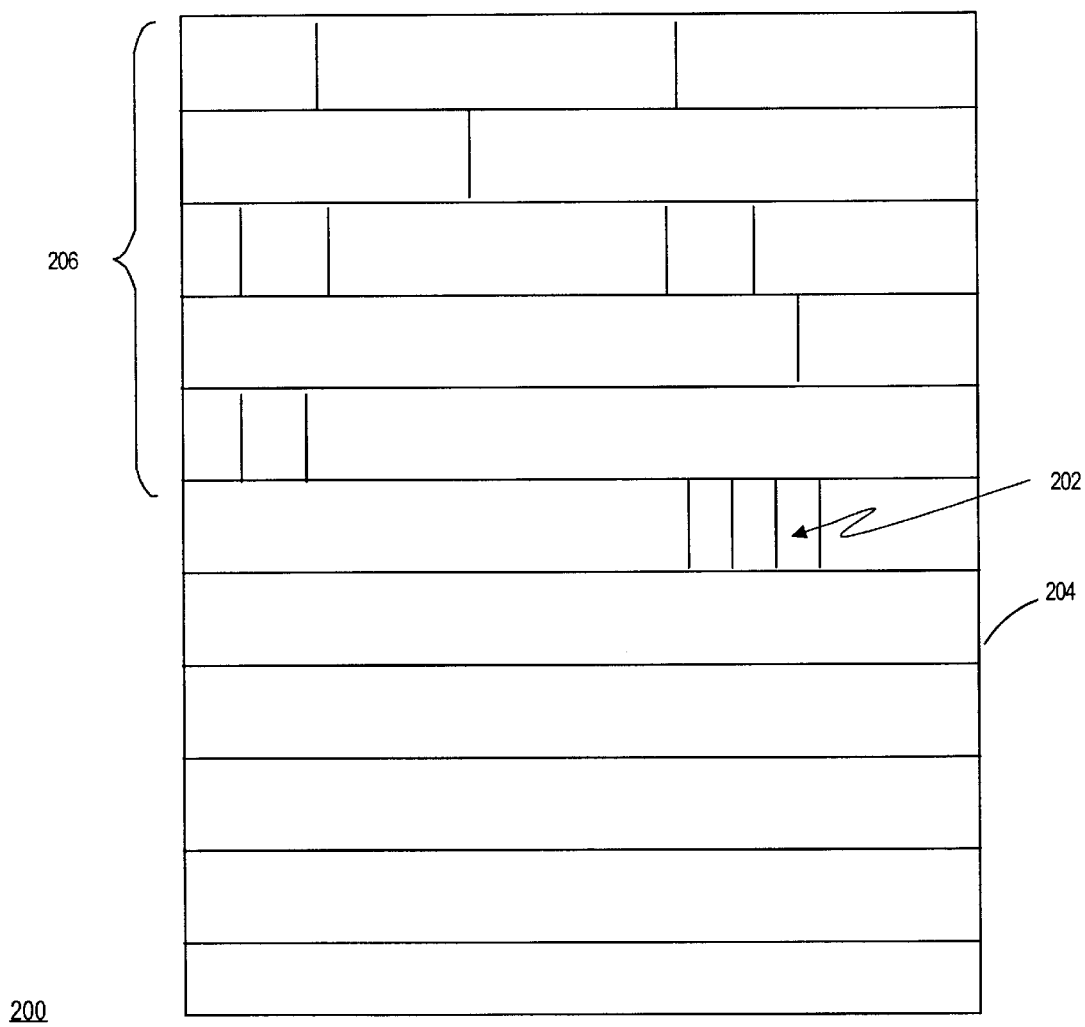
FIG. 2 is a block diagram of an object record of the exemplary object.

FIG. 2 is a block diagram of an exemplary object record 200 associated with the exemplary object 102. The object record 200 includes at least a description string 204, a license indicator 202 and object attributes data 206. The object record 200 is created within the document file when the user inserts the object 102 from the library to the document. The various fields within the object record 200 are arranged and formatted in accordance with the particular application and the operating system. Without the proper software tools, however, the different fields are difficult to identify and interpret. The description string 204 includes several bits of information that describe the image of the object 102. In the exemplary embodiment, the description 204 may be a vector image description, bit map image description or a combination of bitmap and vector descriptions. The object attributes data 206 includes various types of information relating to the object's 102 attributes such as growth dimensions, location, and rotation point. The license indicator data 202 is a single bit, in the exemplary embodiment, that indicates whether the tag 104 should be coupled to the object 102. When a tag 104 is to coupled to an object 102, the tag record is used to form the tag over the object 102. When the object 102 is either displayed through a device or printed, the tag 104 is also displayed or printed, partially obscuring the object 102. In accordance with the application, the tag 104 is centered across the object 102 and the proportionality between the tag size and the object 102 size remains constant as the size of the object 102 is changed.

In addition to indicating whether the object 102 should include a tag 104, the license indictor 202 results in a disabling of the ungroup function for the object 102 when detected. A group function typically provided in drawing applications allows the various components of and object 102 to be grouped together to form a single object 102 which is selected, moved, deleted, resized or copied as a single object. The ungroup functions allows the various components of a grouped object to behave as independent objects. This function is often used to edit objects by selecting individual components of an object 102.

The object records 200 are complicated files that include large amounts of data that is not easily understandable without the appropriate knowledge and tools. An unscrupulous individual, therefore, wishing to remove the tag 104 without authorization would expend an unjustifiable amount of time deciphering and editing the object record 200 to create a new record associated with an object 102 that no longer contained the tag 104. If a valid license is obtained, the data in the object record 200 is modified to remove the instruction to include the tag 104 by setting the license indicator 202 to the appropriate value. The ungroup function also is enabled for the object 102 as a result of the changed license indicator.

FIG. 3 is block diagram of an exemplary library 300 in accordance with the exemplary embodiment of the invention. Preferably, the library 300 includes a header 302, and several object data strings 304. The header contains a library license field 306 and an object string characteristics 308. The object string characteristics 308 include information relating to the objects 102 found in the library which may include parameters such as the number of object data strings 304, location of each object data string in the library, and other descriptive information relating to the object data strings 304.

Each of the object data strings 304 contains several bits of information that describe the appearance of the object 102. When the object record 200 is formed in the document, the object data string 304 associated with the object 102 is used to create the description string 204 in the object record 200.

In the exemplary embodiment, the library license field 306 includes a license name string identifying the license required for the library 300. When a license is obtained and stored in memory, the license name string is used to locate the license.

Those skilled in the art will recognize the variety of structures and formats that may be used to create the library file and that the library file may contain additional information as compared to the exemplary library 300.

Figure 4:
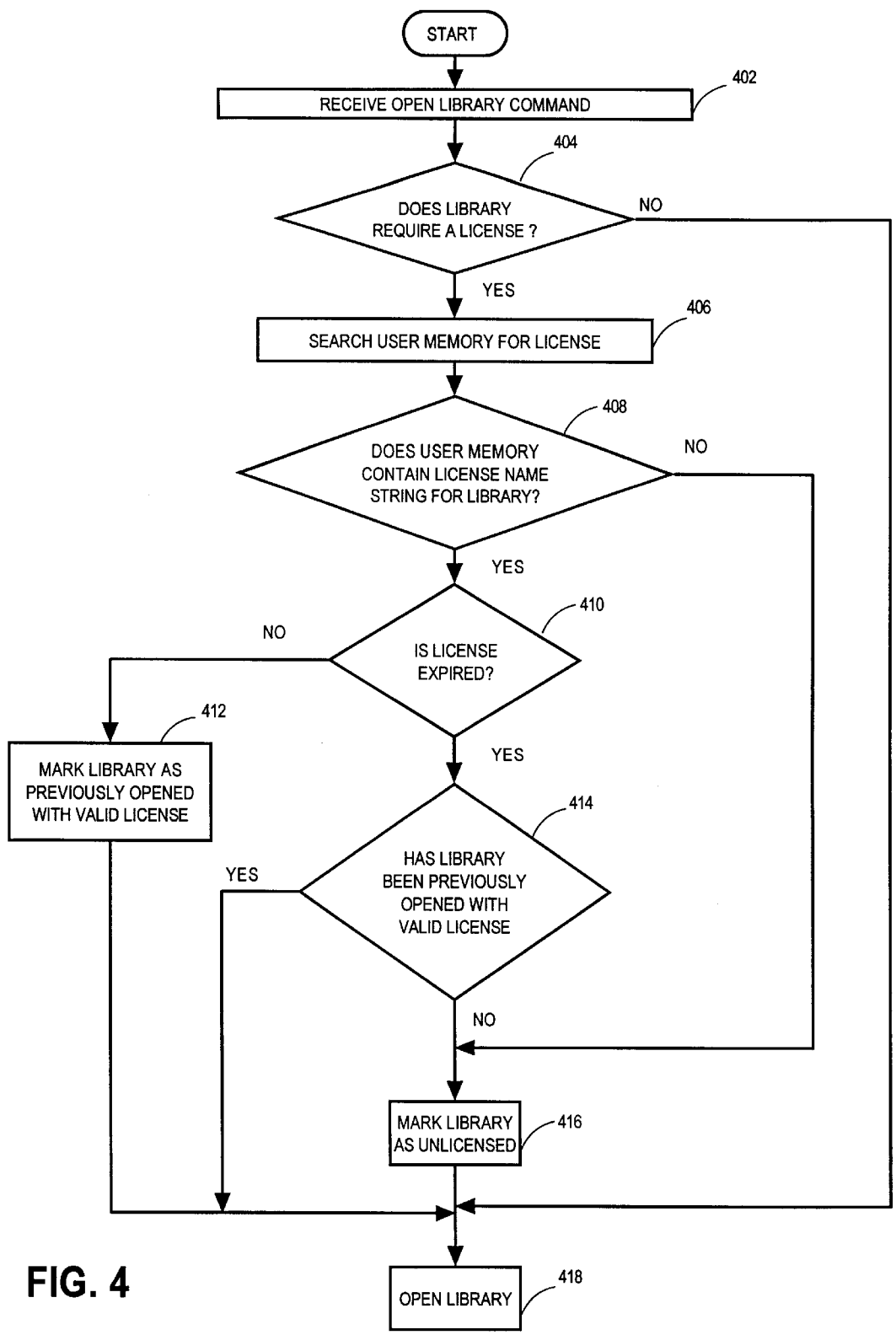
FIG. 4 is a flow chart of a method of opening a library in accordance with the exemplary embodiment of the invention.

FIG. 4 is a flow chart of a method of opening a library 300 in accordance with the exemplary embodiment of the invention. At step 402, a command is received from user to open the library 300. Any one of several known methods may be used to indicate that the user is attempting to open the library 300. For example, the user may use a mouse to select a symbol representing the library 300.

At step 404, it is determined whether the library 300 requires a license. The license name string is identified within the library license field 306. If the library license field 306 indicates that no license is required, the method continues at step 418 where the library is opened using known techniques. A suitable method of indicating that no license is required includes using an absence of data as an indication. Other methods include including data that has a predetermined string.

If a license name string is found in the library license field 306, the method continues at step 406 where the user memory is searched. Preferably, a search for the license name string is performed in the data structures of the program memory of the computer 702 running the license procedure 708.

At step 408, the results of the search of step 406 are used to determine whether the user memory contains the library license by determining whether the license name string exists in memory. If the appropriate license is not found, the method proceeds to step 416 where the library 300 is marked as unlicensed.

If a license matching the license name string is found, the application determines if the license has expired at step 410. If the license has not expired, the library 300 is marked a previously opened by setting appropriate bits within the library license field at step 412. After marking the library 300 as previously opened, the method proceeds to step 418 where the library is opened.

If the license is expired, the method continues at step 414 where the library license field 306 is read to determine if the library 300 has been previously opened with a valid license. The appropriate bits within the library license field 306 are analyzed to determine if the library 300 has been previously opened. If the library 300 has been previously opened with a valid and non-expired license, the method proceeds to step 418. Otherwise, the method continues at step 416 where the library 300 is marked as unlicensed as it is opened at step 418.

When the library 300 is opened at step 418, a temporary library record is formed in accordance with known techniques except that the library record includes open library license indicator that indicates whether the library has been opened with a valid license. If the library is marked as unlicensed at step 416, the appropriate predetermined data string (open library license indicator) is inserted into the temporary library record to indicate that the library 300 has been opened without a valid license.

Figure 5:
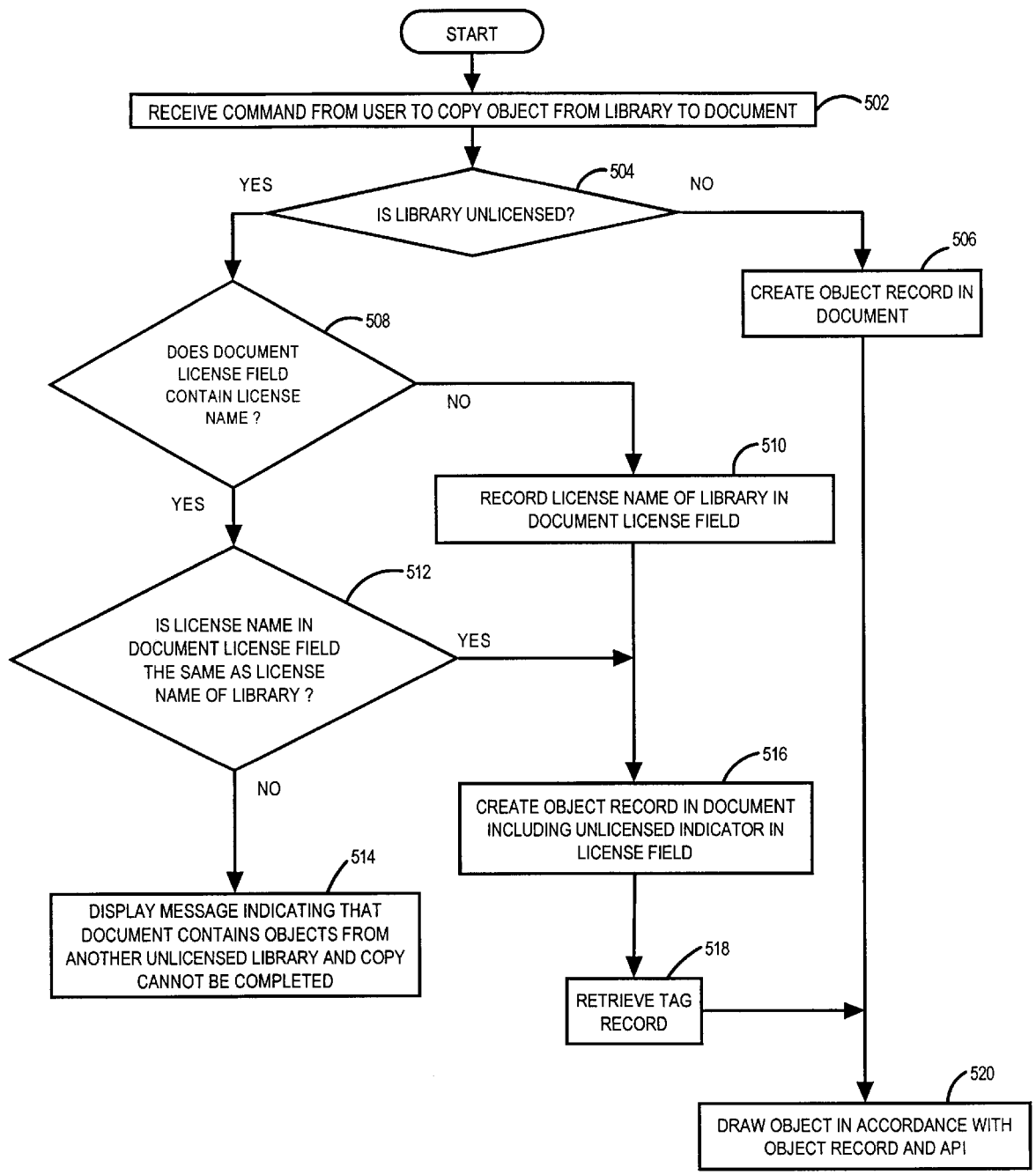
FIG. 5 is flow chart of method of inserting an object from a library into a document in accordance with the exemplary embodiment of the invention.

FIG. 5 is flow chart of a method of inserting an object 102 from a library 300 into a document in accordance with the exemplary embodiment of the invention. After a library is opened, the user may select objects 102 to be used in a drawing (document). As described above, when the user selects and places and object 102 into a document, an object record 200 is produced within the document based on the object data string 304 in the library and other information. A tag is drawn with the object 102 partially obscuring the object 102 if the library 300 from which the object 102 was selected is unlicensed.

At step 502, the application receives a command from the user to place an object 102 selected from a library 300 into a document. The command may be initiated in any one of several known ways. The user may, for example, use a mouse to select, drag and place a representative symbol of the object 102 into the drawing.

At step 504, the open library license indicator in the library record associated with the library 300 is read to determine whether the library 300 is unlicensed. If the library 300 is licensed, an object record is created in the document at step 506. Otherwise, the method continues at step 508 where a document license field is analyzed to determine if it contains a license name. The license name in the document license field indicates the unlicensed library 300 that was used to create at least one object 102 in the document. If no license names are found in the document license field, the document does not contain any unlicensed objects 102. In this case, the document may contain objects 102 not requiring license and objects 102 inserted into the document when the appropriate valid license was available.

If the document license filed does not contain a license name string the method proceeds to step 510 where the license name string corresponding to the library 300 currently accessed is recorded in the document license field.

If the document contains unlicensed objects 102, the method continues at step 512 where it is determined whether the license name string in the document license field is the same as the license name string of the current library 300.

If the license name strings do not match, the method proceeds to step 514 where a message is displayed to the user indicating that the document contains objects 102 from another unlicensed library (300) and the object 102 selected can not be inserted into the document.

If the license names match, the method continues at step 516. Therefore, if the library 300 is unlicensed and the document license field either does not contain a license name or contains the same name as the current library 300, the method continues at step 516.

At step 516 an object record 200 is created in the document. The license indicator data 202 in the object record 200 indicates that the tag 104 should be included with the object 102.

The tag record is retrieved at step 518. In the exemplary embodiment, the tag record is included in the program resources file containing various program image information such as the characteristics of menus and error messages, borders of window displayed by the program, scroll bars and other user interface graphics. Those skilled in the art will recognize that the tag record may be located in a variety of locations. For example, a tag record may be duplicated within each unlicensed object 102 and only used for drawing the object 102 if the unlicensed indicator bit is set in the object record.

At step 520, the object 102 is created in accordance with the object record and the Windows® API. The object record 200 is interpreted by the API to form the various image components to create the object 102 on the monitor screen, on a printed medium through printer or through any other output visual device.

Figure 6:
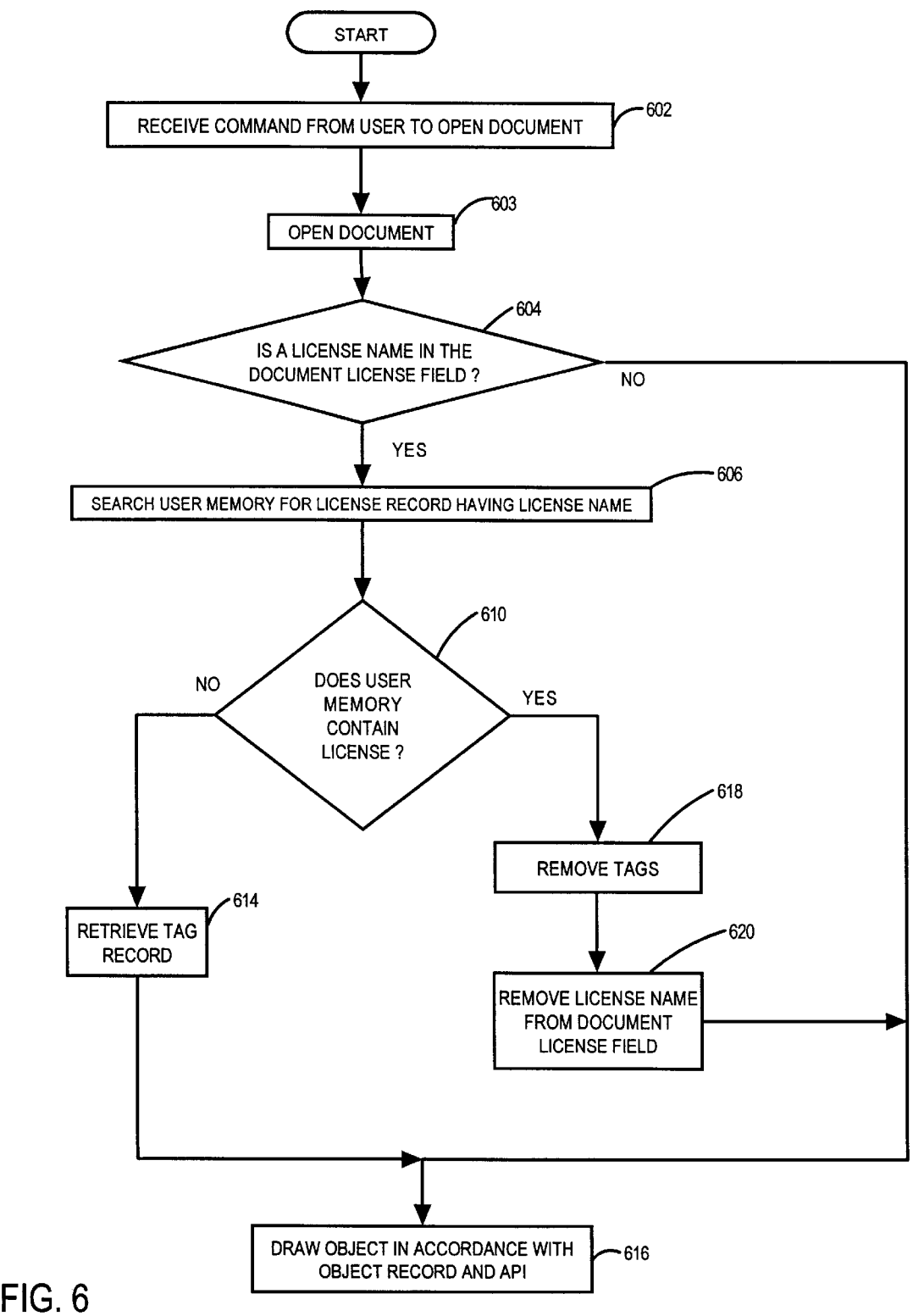
FIG. 6 is flow chart of method of opening a document in accordance with the exemplary embodiment of the invention.

FIG. 6 is flow chart of method of opening a document in accordance with the exemplary embodiment of the invention. After a document is created and stored electronically, it can be mailed electronically or otherwise transferred to another computer (702) or memory. Duplicates of the document can be created and stored or sent to other users. Preferably, if the document is created with a valid licenses, the can be opened without the licenses corresponding to any of the libraries used to create the document.

At step 602, a command is received from the user indicating that a document should be opened. The user may use any one of several known techniques to enter command such as using a mouse. The document is opened using known techniques at step 603.

At step 604, the document license field is examined to determine if a license name string is listed and if the document requires a license for a library 300 used to create at least one of the objects 102 found in the document. If no license name string is detected, the method proceeds to step 608 where the document is opened and to step 614 where the objects 102 within the document are drawn. Since the license indicator bit within each of the objects 102 in the document is not set to indicate that the objects 102 are unlicensed, the objects 102 are drawn, printed or otherwise displayed without the unlicensed tags.

If, however, a license name string is found in the document license field, the method continues at step 606. A search is performed for the license name on the memory at step 606. In the exemplary embodiment, the Random Access Memory (RAM) of the computer is searched using known techniques.

At step 610, the results of the search performed at step 606 are used to determine if the user has a valid non-expired license corresponding to the license name found in the document license field. If the license is not found or if the license is expired, the method continues at step 614.

At step 614, the tag record is retrieved in order to obtain the necessary information to draw the tag across the object 102 when the object 102 is drawn, displayed or printed at step 616.

If a valid, non-expired license is found, the method continues at step 618, where the tags from the objects 102 are removed by setting the license indicator bit in every object 102 to indicate that the object 102 is not unlicensed.

At step 620, the license name is removed from the document license field to indicate that the document has been opened with a valid, non-expired license. The method proceeds to step 616 where the objects 102 are drawn, printed or other wise displayed without the unlicensed tags. Therefore, in the exemplary embodiment, if a document is opened with a valid license it no longer requires a license to be viewed or printed without tags. Those skilled in the art will recognize that alternate methods may be used for determining when a particular document will include the unlicensed tags based on other criteria.

As discussed above, the objects 102 are drawn printed or displayed at step 616. The objects 102 are drawn with an unlicensed tag across the object 102 partially obscuring the object 102 if the license indicator bit (202) indicates that the object 102 is not licensed. The tag record and the object record 200 provide the necessary information when interfaces with the API to form the objects 102 with the tags. If, however, the license indicator bit indicates that the object 102 is licensed, the object 102 is drawn, printed or displayed without the record using the object record.

FIG. 7 is block diagram of a software distribution system 700 in accordance with the exemplary embodiment of the invention. In the exemplary embodiment, the graphics program 706, licenses and the object libraries 300 are downloaded to the user through a packet switched network 712 such as the Internet 712. The various programs, licenses and libraries may be transferred to the user's computer 702 in any one a several known methods. For example, the digital information may be stored on a CD-ROM or magnetic medium and transferred to the computer 702.

In the exemplary embodiment, a server computer includes an internet server process 722 that facilitates communication through the Internet 712 using known techniques. Files containing object libraries 718 and library licenses 718 are stored in memory (not shown) within the server computer 720 or are easily accessible by a processes running on the server computer 720 using known techniques.

A local processor 702 such as personal computer (PC) provides the necessary hardware for interfacing to the Internet and running application programs including the exemplary graphics program 706 and a Web browser 710. An operating system (OS) 704 provides the low-level software which schedules tasks, allocates storage, handles the interface to peripheral hardware, provides a operational platform for applications and presents a default interface to the user when no application program is running. The operating system 704 in the exemplary embodiment is the Windows® 95 or later version of the Windows® OS available from Microsoft® Corporation. As discussed above, the license procedure 708 is performed as part of the graphics program 706 in the exemplary embodiment.

The user may access a Web site of the graphics program provider using the Web browser and the link associated with the Web site The user may access the server using other methods. For example, the application program can be designed to include the appropriate software to establish communications between the user and the server or other third party software may be used. In the exemplary embodiment, the application program is downloaded from the server 720 to the local processor 702 using known techniques. The user, preferably, receives a several basic object libraries 300 that do not require licenses when the application 706 is downloaded. As explained above, libraries 300 that do not require a license do not have a license name string within the library license field 306 of the library file 300.

The user downloads an additional library 300 through the graphic user interface provided by the server computer 720 and Web browser 710 (or other communication application). The user navigates through the various web pages to find a desired library 300. After the user indicates that a library 300 should be downloaded, an electronic file containing the appropriate instructions for loading the library 300 on the users system is transmitted through the internet to the local processor 702. The file is launched to load the library file 300 in the appropriate location in memory. If the library 300 requires a license and the user has not yet obtained the license, the objects 102 may be used with the graphics program 706 and will appear with the tags 104.

In order to obtain a license, the user accesses the appropriate web page and submits the requested information to the server computer 720. Preferably, the information is sent in a secure state using known techniques. In the first embodiment, the requested information includes at least credit card information for billing purposes. The user's, name, credit card number, and expiration date are entered in the appropriate fields within a web page and sent to the server computer 720. The server computer 720, in response to the license request, transmits a license loading file to the local processor 702 through the Internet 712. The license loading file is downloaded to the local processor 702. The license loading file includes a set of instructions that store the requested license on the memory of the local processor when executed. When launched, the license loading file causes either the creation, or modification of a license table 800 located on the memory of the local processor. If no license table exists, a license table is created. In the exemplary embodiment, the instructions corresponding to the license loading file are written to the system resource file and initiate the graphic drawing application program 706 that reads the instructions to perform the appropriate action.

Figure 8:
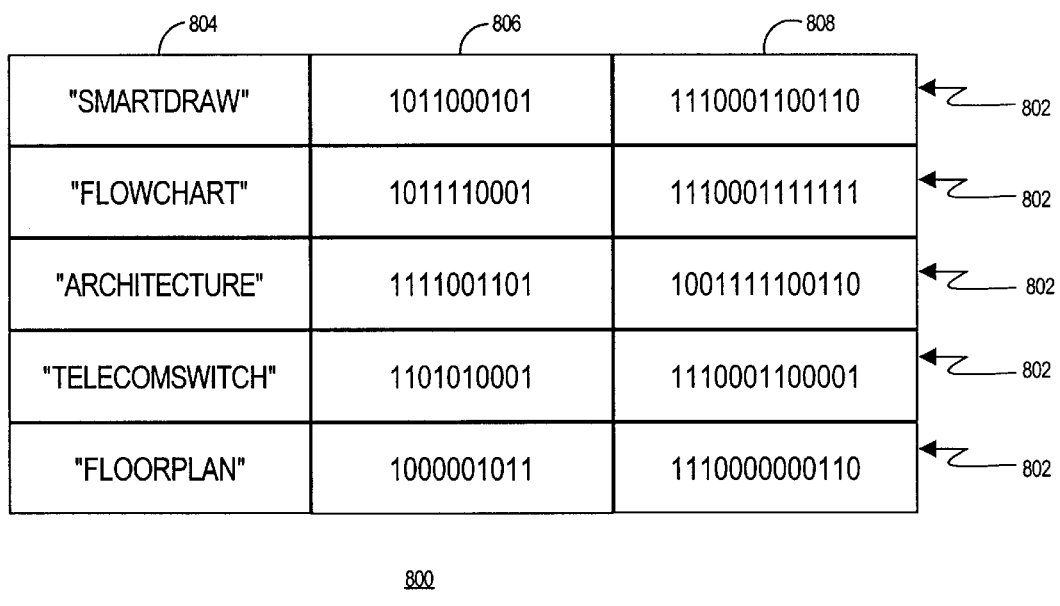
FIG. 8 is a block diagram of an exemplary license table having several exemplary license records.

If the a license table 800 exists, a license record is created and placed within the license table. FIG. 8 is a block diagram of an exemplary license table 800 having several exemplary license records 802. In the exemplary embodiment, each license record 802 includes the license name string 804, an expiration data 806, and maximum number of users allowed (user max) 808. Other data may be included in each license record 802. For example, the license record 802 may contain the serial number of the hard drive of the computer, personal name of the user, company name of the user or any other data relating to the administration or management of the license. When the license record 802 is created, the expiration date 806 and the user max 808 are encrypted. The unique identification number of the local processor 702, such as the serial number of the hard drive, is included in the file to further restrict use of the table to the particular computer. In alternate embodiments, the license table 800 may contain other fields within the license records describing the particular license or providing information regarding the application of the license.

When a license is updated to reflect a new expiration date or other change, the license record for the license is determined in the license table 800 and overwritten with the new license record.

In the exemplary embodiment, the user obtains a subscription for a particular library set by purchasing a license having an expiration time. The license allows the user to download and use newly developed libraries related to the originally licensed library 300 without additional costs. The objects 102 from the libraries (300) will appear without the unlicensed tags since the local processor 702 contains the appropriate license. For example, if the user purchasing a license for a flow chart library that is valid for one year, the user may download new flow chart libraries for the year without the need for additional licenses and without having the unlicensed tags appear on the objects 102 from the new licenses. After the license expires, the user may continues to use the libraries (300) obtained during the license period without the objects 102 appearing with the tags 104. Any objects 102 contained in libraries (300) having creation dates subsequent to the expiration date of the license, however, will appear with the unlicensed tag 104.

Preferably, the user receives, through electronic mail, a message from the server computer indicating that new libraries have been created for the licenses that the user has obtained. In the exemplary embodiment, an electronic mail message is transmitted at four times per year to the user from the server computer 720. The server computer 720 maintains a data base of all users that have purchased a license and corresponding expiration dates. The server computer 720 sends an electronic mail message to warn the user that a particular license is near its expiration date. The user is reminded that the objects 102 within new libraries (300) will be displayed with an unlicensed tag 104 unless a new license is obtained.

In an alternate embodiment, a user may purchase an updated license at a lower cost than a new license for the same library set. If a license update is purchased, the a license loading file is transmitted as explained above. The license record will only be stored in the license table 800 if an earlier license corresponding to the library set exists in the license table 800 exists.

Therefore, the licensing apparatus and method provides efficient management of access and use of newly developed libraries while allowing the user to sample review and use objects 102 within the libraries. The objects 102 within unlicensed libraries 300 will function as licensed objects 102 except that each object will include an unlicensed tag 104 partially obscuring the object 102.

Although the exemplary embodiment described above relates to graphics programs and visual objects, those skilled in the art will recognize that method and apparatus for managing a license for an object may be used with other types of visual objects and other types of graphic programs.

Clearly, other embodiments and modifications of this invention will occur readily to those of ordinary skill in the art in view of these teachings. Therefore, this invention is to be limited only by following claims, which include all such embodiments and modifications when viewed in conjunction with the above specification and accompanying drawings.

I claim:

1. A method of opening a library comprising:
   determining a license requirement of the library based on a contents of a library license field within the library; and
   creating a library record in accordance with the library, the library record including an open library license indicator based on the detection of a license corresponding to the library, wherein the open library license indicator results in a display of tag partially obscuring an object selected from the library when the license corresponding to the library is not detected.

2. A method in accordance with claim 1 further comprising:
   searching a memory for a license name string within the library license file to detect the license corresponding to the library.

3. A method in accordance with claim 2, wherein the open library indicator corresponds to license indicator data within an object record created when the object is inserted into a document from the library, the license indicator data resulting in the display of the tag partially obscuring the object.

4. A method of opening a document within a graphics program running on a local processor, the method comprising:
   determining a license requirement of the document based on a contents of a document license field within the document;
   searching for a license within a memory of the local processor if the license is required, the license indicated by the contents of the document license field; and
   if the license is not located, displaying an object within the document with a tag partially obscuring the object when the object is displayed.

5. A method in accordance with claim 4 wherein the displaying of the object further comprises displaying the tag if a license indicator within an object record corresponding to the object indicates the object is unlicensed.

6. A method in accordance with claim 5, further comprising:
   adapting the contents of the document license field to indicate no license is required for the document if a license corresponding to the contents of the document license filed is located in the memory of the local processor; and
   displaying the object without the tag when the document is displayed.

7. A method in accordance with claim 6 further comprising:
   adapting the license indicator within the object record to indicate no license is required for the object.

8. An object record created in a document, the object record corresponding to an object when the document is displayed, the object record comprising:
   an object description string describing an appearance of the object when the object is displayed; and
   a license indicator indicating a license status of the object, the license indicator resulting in a display of a tag partially obscuring the object when the object is displayed.

9. An object record in accordance with claim 8, wherein the license indicator corresponds to an instruction to attach a tag record to the object record, the tag record corresponding to the tag when the object is displayed.

10. An object record in accordance with claim 9, wherein the instruction is adapted for execution by an application program interface.

11. A method of providing an object for use with a graphics program, the method comprising:
    supplying a license corresponding to the object, wherein the object is displayed with a tag partially obscuring the object when a document created without the license is displayed.

12. A method in accordance with claim 11, further comprising:
    providing access to a library containing the object; wherein the supplying the license comprises supplying the license in response to a fee payment.

13. A method in accordance with claim 12 wherein the providing access to the library comprises providing access to electronic data representing the library through a packet switched network.

14. A method in accordance with claim 13 wherein the supplying the license comprises:
    transmitting a license loading file through the packet switched network to a local processor; and
    executing the license loading file on the local processor to load the license within a license table on a memory of the local processor.

15. A method in accordance with claim 11, wherein the object is a graphic object and the tag modifies the perception of the object by partially obscuring the object when the object is displayed.

16. A method in accordance with claim 15, wherein the object is displayed through a video output device.

17. A method in accordance with claim 16, further including printing the object on a printed output media with the tag partially obscuring the object.

18. A method in accordance with claim 15, wherein the object is displayed through a video monitor.

19. A method in accordance with claim 11, further including analyzing an object record corresponding to the object, the object record comprising construction information adapted to produce the object when interpreted by an application program interface.

20. A method in accordance with claim 19 further including detecting license indicator data within the object record.

21. A method in accordance with claim 20, further including providing a tag record to the application program interface, the tag record providing construction information adapted to produce the tag when interpreted by the application program interface.

22. A method in accordance with claim 21 further including:

inserting the license indicator data into the object record when the object record is created; and creating the object record in response to an object insertion instruction indicating placement into a document.

23. A method in accordance with claim 22, wherein the object insertion instruction comprises a selection instruction indicating selection of the object from a library.

24. A method in accordance with claim 23, further including modifying the license indicator data in the object record to indicate the object is licensed in response to a detection of a valid license corresponding to the library.

25. A method in accordance with claim 24, further including displaying the object through a video output device without the tag when the license indicator data indicates the object is licensed.

* * * * *